United States Patent
Flannery

(10) Patent No.: US 8,415,043 B2
(45) Date of Patent: Apr. 9, 2013

(54) SYSTEM FOR REDUCING THERMAL TRANSFER BETWEEN CELLS IN A BATTERY

(75) Inventor: Michael R. Flannery, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 13/551,644

(22) Filed: Jul. 18, 2012

(65) Prior Publication Data

US 2012/0282505 A1 Nov. 8, 2012

Related U.S. Application Data

(62) Division of application No. 12/317,805, filed on Dec. 30, 2008, now abandoned.

(51) Int. Cl.
| | |
|---|---|
| *H01M 10/50* | (2006.01) |
| *H01M 2/12* | (2006.01) |
| *H01M 6/42* | (2006.01) |

(52) U.S. Cl. ............... 429/82; 429/121; 429/149
(58) Field of Classification Search .............. 429/82, 429/149, 121
See application file for complete search history.

(56) References Cited

U.S. PATENT DOCUMENTS

| | | | |
|---|---|---|---|
| 6,033,795 | A | 3/2000 | Broussely et al. |
| 6,087,036 | A | 7/2000 | Rouillard et al. |
| 6,117,584 | A | 9/2000 | Hoffman et al. |
| D441,290 | S | 5/2001 | West |
| 6,942,944 | B2 | 9/2005 | Al-Hallaj et al. |
| 2008/0081252 | A1* | 4/2008 | Miyazaki ................. 429/149 |

OTHER PUBLICATIONS

Motorola TDB, et al.; "Lithium Ion Battery with Improved Safety Through Use of Internal PTC;" website; Jan. 1999; pp. 1-3.

* cited by examiner

*Primary Examiner* — Joseph Kosack
(74) *Attorney, Agent, or Firm* — McClure, Qualey & Rodack, LLP

(57) ABSTRACT

A battery assembly comprising a housing defining an interior and at least two electrical storage cells located in the interior of the housing. A thermal transfer barrier located in the interior of the housing, the thermal transfer barrier being positioned between the at least two cells in the housing, wherein the thermal transfer barrier is formed of a material having a greater insulation capability than a material of the housing.

7 Claims, 3 Drawing Sheets

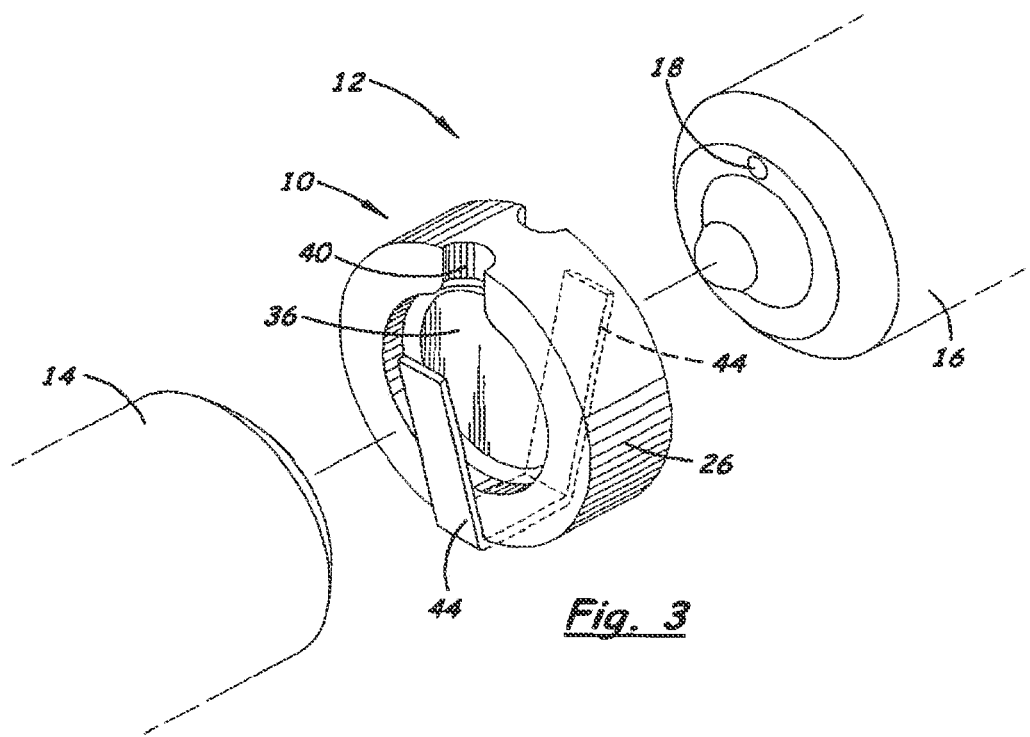
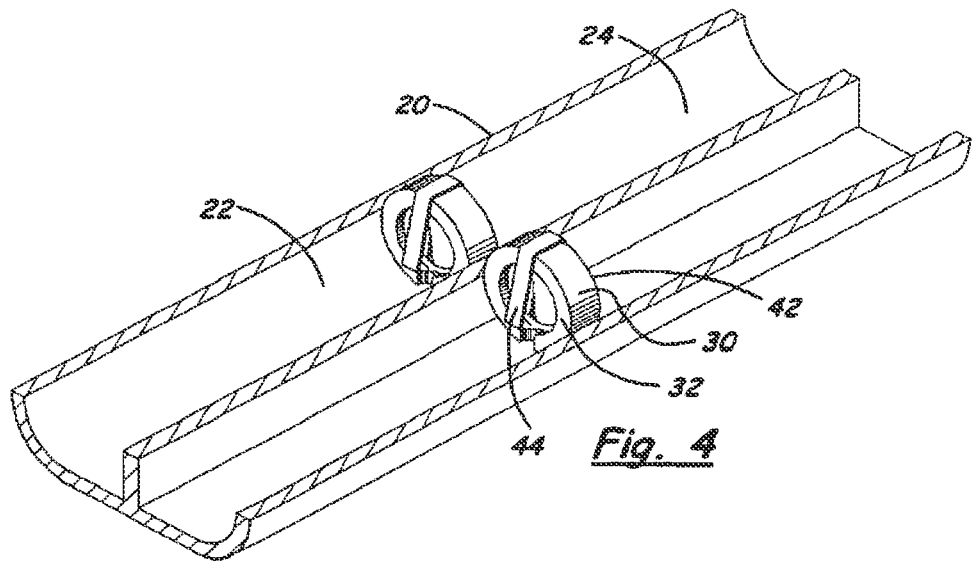

SYSTEM FOR REDUCING THERMAL TRANSFER BETWEEN CELLS IN A BATTERY

CROSS REFERENCE TO RELATED APPLICATIONS

This application is a Divisional of application Ser. No. 12/317,805, filed Dec. 30, 2008, the entirety of which is incorporated by reference herein.

BACKGROUND

1. Field

The present disclosure relates to batteries, and more particularly pertains to a new system for reducing thermal transfer between cells in a battery to reduce the possibility of a cascade thermal runaway of cells in the battery.

2. Description of the Prior Art

The use of portable devices for various tasks has become ubiquitous, and while the miniaturization of various components that make up these devices is a part of their increasing popularity, and the ability to power these devices for longer and longer time periods has also added to the portability and ease of use of the devices. Contributing to the improvement in the ability to power these portable devices is the development of new battery technologies with seemingly ever increasing charge capacities in smaller and smaller packages.

These developments have not been without their occasional drawbacks, and one example of this is the development of lithium ion battery technology. While delivering relatively greater charge capacities in relatively smaller packages, the lithium ion cells have the potential to generate very high temperatures if there is a failure in the circuitry or structure of the cell that causes, for example, a short circuit. These high temperatures are not only damaging to the battery and the device in which the lithium ion cell is incorporated or attached, but can cause other damage by fire if the battery continues to malfunction.

More specifically, the effort to increase the density of the cells to provide a greater charge capacity in a smaller space has tended to make the cells more vulnerable to defects and damage that can cause such failures. The increasing density has been achieved through manufacturing techniques that make the components of the cell thinner, such as the separator between anode and cathode. Thus, the manufacturing methods have become more critical not only to the operation of the cell but also to the safety of the cell, especially as the cells become denser. For example, the presence of small metallic dust particles in the cell can cause a short circuit in the cell if these particles come into contact with the oppositely charged parts of the cell. Elimination of all of these dust particles from the manufacturing process may be virtually impossible.

While a mild short may generate only a small amount of heat and may lead to an accelerated degree of self-discharge, the presence of enough metal particles at one location can produce a major electrical short and a much larger current flow between the positive and negative plates, causing a more significant temperature rise and possibly the condition sometimes referred to as "thermal runaway" in which flaming gases may be vented from the cell.

During thermal runaway of a cell, the heat generated in the malfunctioning cell can be transferred to an adjacent cell in the battery package, causing the adjacent cell to become thermally unstable. This heat transfer can lead to a chain reaction in which failure of a cell cascades to an adjacent cell, and the process may be repeated to other cells. Thus, not only can the malfunctioning cell of the battery be affected, but cells adjacent to the malfunctioning cell can be exposed to the heat generated by the malfunction and the performance and operation of the adjacent cell can be affected, even to the point that the adjacent cells can be caused to also malfunction. Typically, a cell will include a vent that allows the hot gases to escape from the interior of a cell when pressures in the interior of the cell exceed a threshold level. The vent is typically located toward or on the end of the cell, which often has an elongated cylindrical shape. The positioning of the vent are the end of the cell, which is often next to an adjacent cell, can allow the hot, pressurized gases escaping from the malfunctioning cell to contact, and heat, the adjacent cell, which can in turn cause overheating and excess pressure in the adjacent cell.

It is therefore believed that there is a need in the art for a device that increases the safety of operation of cells in a battery, especially but not limited to lithium ion batteries, to decrease the possibility that a malfunction in one cell of the battery is able to propagate to another adjacent cell.

SUMMARY

In view of the foregoing disadvantages inherent in the known battery designs, the present disclosure describes a new system for reducing thermal transfer between cells in a battery which may be utilized to reduce the possibility of a cascade thermal runaway of cells in a the battery.

The present disclosure relates to a new thermal transfer barrier that is positionable adjacent to an electrical storage cell having a vent configured to release gasses from the cell. The thermal transfer barrier comprises a barrier member having a first side for orienting toward the vent on the cell. The first side is contoured in a manner configured to collect gas directed toward the first side of the barrier member from the vent when released from the vent and guide the collected gas away from a cell positioned adjacent to the cell.

In another aspect, a battery assembly comprises at least two electrical storage cells with at least one of the cells having a vent configured to release gasses from the cell. A thermal transfer barrier is positioned between the at least two cells, and the barrier is positioned adjacent to the vent on the at least one cell such that gasses released through the vent are directed toward the thermal transfer barrier. The thermal transfer barrier forms a thermal barrier between the cells.

In one yet another aspect, a battery assembly comprises a housing defining an interior and at least two electrical storage cells located in the interior of the housing. A thermal transfer barrier is located in the interior of the housing and is positioned between the at least two cells in the housing. The thermal transfer barrier is formed of a material having a greater insulation capability than a material of the housing.

The foregoing is a general outline of some-of the more significant aspects of the disclosure, and the detailed description of this application that follows discloses additional features of the disclosure which form the subject matter of the claims appended hereto.

The advantages of the various embodiments of the present disclosure, along with the various features of novelty that characterize the embodiments, are disclosed in the following descriptive matter and accompanying drawings.

BRIEF DESCRIPTION OF THE DRAWINGS

The disclosure will be better understood when consideration is given to the following detailed description thereof. Such description makes reference to the annexed drawings wherein:

FIG. 3 is a schematic perspective view of the thermal transfer barrier positioned between two adjacent cells of a battery, according to an illustrative embodiment.

FIG. 4 is a schematic perspective view of a battery housing with the thermal transfer barrier, according to an illustrative embodiment.

DESCRIPTION OF PREFERRED EMBODIMENTS

Figure 1:
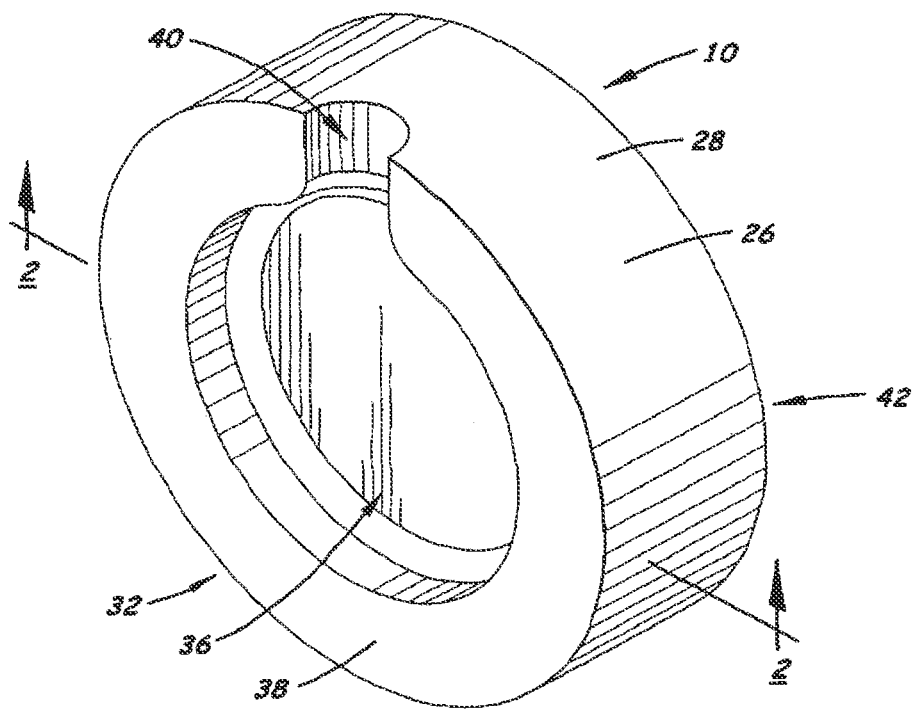
FIG. 1 is a schematic perspective view of a new thermal transfer barrier according to the present disclosure.
Figure 2:
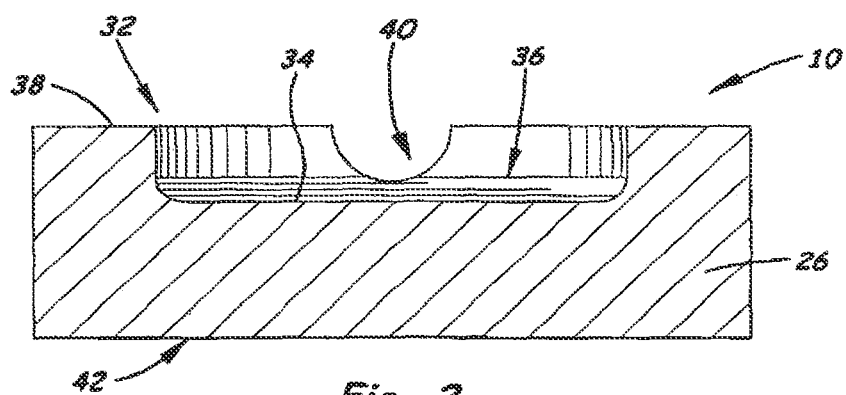
FIG. 2 is a schematic sectional view of the thermal transfer barrier, according to an illustrative embodiment, taken along line 2-2 of FIG. 1.
Figure 5:
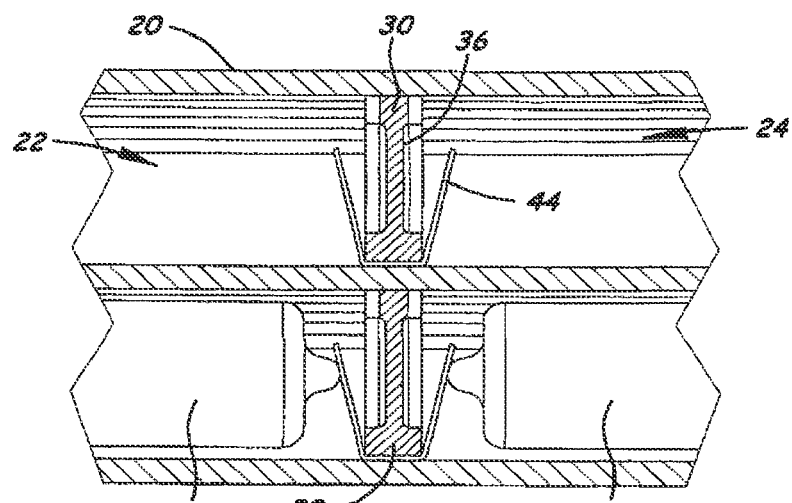
FIG. 5 is a schematic sectional view of the battery housing including the barrier, according to an illustrative embodiment.
Figure 6:
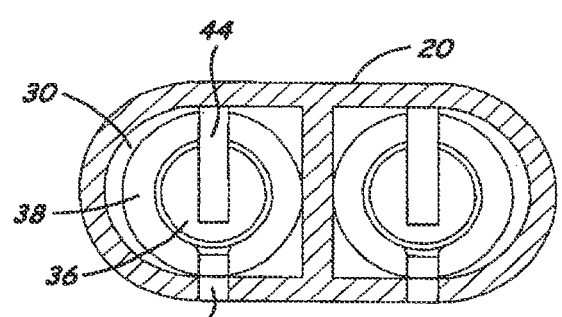
FIG. 6 is a schematic sectional view of the battery housing including the barrier, according to an illustrative embodiment.

With reference now to the drawings, and in particular to FIGS. 1 through 6 thereof, the system for reducing thermal transfer between cells in a battery of the present disclosure generally includes a thermal transfer barrier designated by the reference numeral 10 in this description.

In the following detailed description of preferred embodiment and other embodiments according to the present disclosure, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The present disclosure relates to a thermal transfer barrier 10 that is highly suitable for use in a battery assembly 12 that may comprise at least two electrical storage cells 14, 16 that store electrical energy and discharge that electrical energy between an anode and a cathode, such as electrolytic cells, although the barrier 10 of the disclosure is not limited to such applications. The thermal transfer barrier 10 of the disclosure is suitable for use in a battery 12 that includes more than two cells, especially for those batteries incorporating several cells, but this description will proceed in terms of two cells 14, 16. The thermal transfer barrier 10 is also especially suitable for use in a battery 12 in which the cells 14, 16 are positioned in relatively close proximity to each other in the battery.

While the thermal transfer barrier 10 is useful with virtually any type of electrical storage cell technology, it is especially suitable for use with storage cell technologies that generate, or have the potential to generate, large amounts of heat either in normal operation or during a period of malfunction. One storage cell technology that may experience these conditions is lithium ion-based storage. Although the usefulness of the barrier 10 is not limited to this type of cell technology, the description will be in terms of the lithium-based technology, which has many similarities to other electrolytic cell technologies. The cells 14, 16 are typically (but not necessarily) elongated and cylindrical in shape, which provides ease of manufacture, high energy density and good mechanical stability. One common size is designated as "18650", in which "18" denotes the diameter is 18 mm and "650" denotes the length is 65 mm. Other cell types, such as for example button or prismatic, may be used with the system of the disclosure.

Significantly, the cells 14, 16 may be provided with a vent 18 to release pressure from the interior of the cell developed under extreme conditions such as excessive overcharging or physical damage to the structure of the cell. Opening of the vent 18 may occur at, for example, pressures between of approximately 150 psi to approximately 200 psi (approximately 10 Bar to approximately 13.5 Bar). The vent 18 of the cell 14, 16 is typically located on an end of the elongated cell, and sometimes on or near the positive terminal or anode of the cell.

The battery assembly 12 may include a housing 20 which substantially encloses the cells 14, 16 of the battery and may perform other functions that are not relevant here, such as providing structure for mounting the battery on a larger device, such as, for example, a portable computer. The housing 20 may form at least one cavity 22, with one or more of the cells 14, 16 being positioned in the cavity 22. In some embodiments of the housing 20, two cavities 22, 24 may be formed.

The cavities 22, 24 may be elongated to hold one, or more than one, of the cells 14, 16, particularly when the shape of cells 14, 16 is elongated. When multiple cells 14, 16 are positioned in a cavity, the cells 14, 16 are often positioned in an end to end relationship, with the end (often the anode terminal) of one of the cells 14, 16 being positioned adjacent to the end (often the cathode terminal) of another one of the cells 14, 16. This configuration typically positions the vent 18 on one end of the cell in an adjacent relationship to the end of another cell in the battery, and may orient the vent so that emissions from the vent are directed at another cell in the battery. In other configurations, the ends of some cells of a multiple cell battery are positioned such that the vent on a cell is adjacent to or directed toward an adjacent cell that may or may not be positioned in an end to end relationship with the cell. In either of these configurations, or others not mentioned, gases that are vented from one cell are directed toward, and will likely come in contact with, another cell in the housing of the battery 12. As previously noted, the hot gases vented from one cell can contact an adjacent cell in the battery 12 and cause that adjacent cell to also overheat and vent hot gas. Due to the hot and pressurized character of the gases emanating from the vent 18, an adjacent cell does not have to be in direct contact with the venting cell to be affected by the venting gases, and even if the cells are somewhat spaced from each other, the venting gas of one cell may affect another cell in the battery. The encasement of walls of the housing 12 may trap the gases and further accentuate the heat problem. The adjacent cells 14, 16 may be located sufficiently proximate to each other to permit gases exiting the vent 18 of one cell 14 to contact the other of the cells 16.

The system of the disclosure utilizes the thermal transfer barrier 10 for positioning between two cells 14, 16, especially when the two cells are positioned adjacent to each other. The thermal transfer barrier 10 acts as an obstacle to the movement of heat through the barrier. The barrier 10 may not function as a complete barrier or obstruction to the movement of heat through the barrier 10, although the barrier 10 should provide a substantial impediment to the movement of heat therethrough. The thermal transfer barrier 10 may have an additional function of guiding or directing or diverting gases which may be vented through the vent 18 of a cell away from an adjacent cell.

In various embodiments, the barrier 10 comprises an element that is interposed between cells, such as, for example cells that would otherwise be adjacent to each other if not for the presence of the barrier 10. In some configurations, the barrier 10 is positioned adjacent to the location of the vent 18 on one of the cells so that any gases that are vented from the vent 18 of the one cell are directed away from the other cell. The barrier 10 may thus be positioned between ends of adjacent cells 14, 16 in or on a battery housing or other structure holding the cells in position.

In some embodiments, the barrier 10 comprises a barrier member 26 that may have a disk-like configuration. The barrier member 26 may have a perimeter 28 with a shape that approximates the size and shape of the cells 14, 16 between which the barrier member 26 is positioned. The perimeter 28 of the barrier member 26 may have an edge, and in some configurations the perimeter edge may be substantially circular. The circular disc configuration may facilitate the positioning between cells in a cavity 22 of the housing 20.

In other embodiments, the barrier 10 comprises a barrier wall 30 that may form a portion of the housing 20, and the barrier wall 30 may be incorporated into the battery housing 20. The barrier wall 30 may be positioned between and form two cavities 22, 24 of the housing 20.

In the various configurations of the embodiments, the thermal transfer barrier 10 may have a first side 32 for positioning toward a first one 14 of the cells, and may be positioned toward the vent 18 of the cell 14. The surface 34 of the first side 32 may be contoured to collect gases escaping from the vent 18 of the first cell and may be contoured to direct those escaping gases in a direction away from a second one 16 of the cells which is positioned adjacent to the barrier 10. The contour of the surface 34 of the first side 32 barrier 10 which is positioned between the cells 14, 16 is thus able to divert gases exiting the vent 18 of the cell 14 from an unrestricted path out of the vent 18 and away from the cell 16. The contour of the surface 34 may extend into the first side 32 of the barrier 10, and the contour may be such that a portion of the surface 34 is substantially concave in character. The contour of the surface 34 may include a main portion or region 36, which may be substantially centered on the first side 32 of the barrier 10. The main region 36 may be substantially circular perimeter shape, although the invention is not so limited. The main region 36 may be at least partially surrounded by a ridge 38. The ridge 38 may be substantially annular in shape or configuration, such that the ridge forms a raised area or region about the relatively depressed region of the main region. The ridge 38 thus facilitates the movement of gases expelled in the direction of the first side 32 are guided or directed toward the main region 36. The contour of the surface 34 of the first side 32 may also include a channel region 40 extending outwardly from the main region 26 and through the ridge 38. The channel region may extend radially outward from the main region 36. The path of the channel region 40 may extend substantially perpendicularly to a longitudinal axis of the cell adjacent to which the barrier is positioned. The channel region 40 is thereby able to channel or direct gases collected in the main region 36 of the contour of the surface 34 of the first side 32 in a desired direction, while the presence of the barrier 10 tends to block the gases from reaching and contacting the adjacent cell.

The thermal transfer barrier 10 may have a second side 42 that is positioned toward the second cell 16 when the first side 32 is positioned toward the second side 42. Optionally, the surface of the second side 42 may be contoured in a manner similar to the contour of the first side to direct gasses from the second cell 16 in a direction away from the first cell 14 that may be positioned adjacent to the first side 32.

In various embodiments, the thermal transfer barrier 10 comprises a thermally insulative material that resists the transfer or communication of heat from one side of the barrier to an other side of the barrier so that heat transferred to the barrier by one cell is not transferred in any meaningful degree to the cell on the other side of the barrier. For example, the housing 20 of a battery 12 is commonly formed of a hydrocarbon plastic which may be distorted or even caused to catch fire by intense heat, such as the heat that is present in the gases that may be vented from a cell, which maybe at 300 degrees Fahrenheit or more. The thermal transfer barrier may be formed of a material with higher resistance to deformation when exposed to heat of the temperature of the gases exhausted by the cell when a malfunction occurs. The material of the barrier 10 may differ from the material which forms the remainder of the housing in the heat resistance characteristic. Thus, those portions of the housing 20 that are not directly exposed to the heated outgases may be formed of cheaper and lighter weight materials while the barrier 10, which may be directly exposed to the outgases, is formed of a relatively more heat resistant material.

In some embodiments, the thermal transfer barrier 10 is formed of a material that experiences a phase change when exposed to the heat of the temperature of the hot gasses escaping from the vent 18, so that the heat absorption of the barrier is increased.

The thermal transfer barrier 10 may comprise an electrically non-conductive, or electrically insulative, material that does not conduct electricity between the adjacent cells. In some embodiments, a conductor 44 may be utilized to electrically connect a terminal on one side of the barrier 10 to a terminal on the other side of the barrier.

The thermal transfer barrier 10 may further comprise a non-flammable material that is not readily ignited and thus is unlikely to combust when exposed to high temperatures such as the range of temperatures that might be present when gas is exhausted through the vent of a malfunctioning cell for, for example, the lithium-ion type.

The thermally-insulative, electrically non-conductive, and non-flammable material of the barrier 10 may comprise a non-metallic material, and may comprise a non-hydrocarbon-based material. Illustratively, the material of the barrier may comprise a ceramic material, although those skilled in the art are aware of other suitable thermally and electrically insulating materials that are non-flammable.

Aspects of the invention are disclosed in the foregoing description and related drawings directed to specific embodiments of the invention. Alternate embodiments may be devised without departing from the scope of the invention. Additionally, well-known elements of the invention will not be described in detail or will be omitted so as not to obscure the relevant details of the invention. Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

As the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects. Further, where the term "substantially" is used, it is intended to mean "for the most part" or "being largely but not wholly that which is specified".

What is claimed is:

1. A battery assembly comprising:
   a housing defining an interior;
   at least two electrical storage cells located in the interior of the housing; and
   a thermal transfer barrier located in the interior of the housing, the thermal transfer barrier being positioned between the at least two cells in the housing;
   wherein the thermal transfer barrier is formed of a material having a greater insulation capability than a material of the housing; and
   wherein the thermal transfer barrier has a first side being contoured in a manner configured to collect gas directed toward the first side of the barrier from the vent when released from the vent and guide the collected gas away from the cell positioned adjacent to the at least one cell.

2. The battery assembly of claim 1 wherein the thermal transfer barrier comprises an electrically non-conductive material.

3. The battery assembly of claim 1 wherein the thermal transfer barrier comprises a non-flammable material.

4. The battery assembly of claim 1 wherein the thermal-transfer barrier comprises a ceramic material.

5. The battery assembly of claim 1 wherein the contour of the first side includes a concave-shaped region.

6. The battery assembly of claim 5 wherein the contour of the first side includes a channel in communication with the concave-shaped region.

7. The battery assembly of claim 1 wherein the thermal transfer barrier forms a wall in the housing positioned between the at least two cells in the housing.

* * * * *